(No Model.) 3 Sheets—Sheet 1.

J. McGRATH & G. Y. SMITH.
FLAX THRASHER.

No. 439,889. Patented Nov. 4, 1890.

(No Model.) 3 Sheets—Sheet 2.

J. McGRATH & G. Y. SMITH.
FLAX THRASHER.

No. 439,889. Patented Nov. 4, 1890.

(No Model.) 3 Sheets—Sheet 3.

J. McGRATH & G. Y. SMITH.
FLAX THRASHER.

No. 439,889. Patented Nov. 4, 1890.

Witnesses.
A. H. Opsahl
Emma F. Elmore

Inventors.
John McGrath
George Y. Smith
By their Attorney.
Jas. F. Williamson

UNITED STATES PATENT OFFICE.

JOHN McGRATH AND GEORGE Y. SMITH, OF MINNEAPOLIS, MINNESOTA.

FLAX-THRASHER.

SPECIFICATION forming part of Letters Patent No. 439,889, dated November 4, 1890.

Application filed July 1, 1890. Serial No. 357,362. (No model.)

*To all whom it may concern:*

Be it known that we, JOHN MCGRATH, a citizen of Great Britain, and GEORGE Y. SMITH, a citizen of the United States, residing at Minneapolis, in the county of Hennepin and State of Minnesota, have invented certain new and useful Improvements in Flax-Thrashers; and we do hereby declare the following to be a full, clear, and exact description of the invention, such as will enable others skilled in the art to which it appertains to make and use the same.

Our invention relates to flax-thrashers, and has for its object to provide mechanism which will remove the bolls without injury to the stalk.

Hitherto, in this country especially, little attention has been paid to the flax stalk or straw, in view of the fact that little attempt has been made to utilize the fiber for other purposes than simply to manufacture the same into tow. Flax, as raised in this country, has been raised chiefly for its seed, the straw being allowed for the most part to go to waste. Hence in flax-thrashers of the kind in general use no effort has been made to preserve the straw and its fiber intact. The whole body of flax, head and stalk entire, has ordinarily been passed through a cylinder and concave or other thrashing mechanism, very much as other small grain, like wheat and oats, are thrashed. This mode of thrashing destroys the fiber or mutilates the same to such extent as to make it unfit for twine or linen yarn. In this respect our invention departs from the common flax-thrashing machinery, saving both the seed and the fiber of the flax.

To this end we construct our thrasher of a central revoluble drum encircled by a series of revoluble rollers, which are driven at a relatively high rate of speed. Feed devices are provided adapted to supply the unthrashed flax to the rollers parallel with their axis. The rollers are spring-seated and properly spaced apart from the drum. The action is such that the bolls are detached and broken without any injury to the straw. The rollers may be of less length than the drum, and the extended end of the drum may be used to co-operate with endless bands to constitute the parallel feed.

Figure 1:
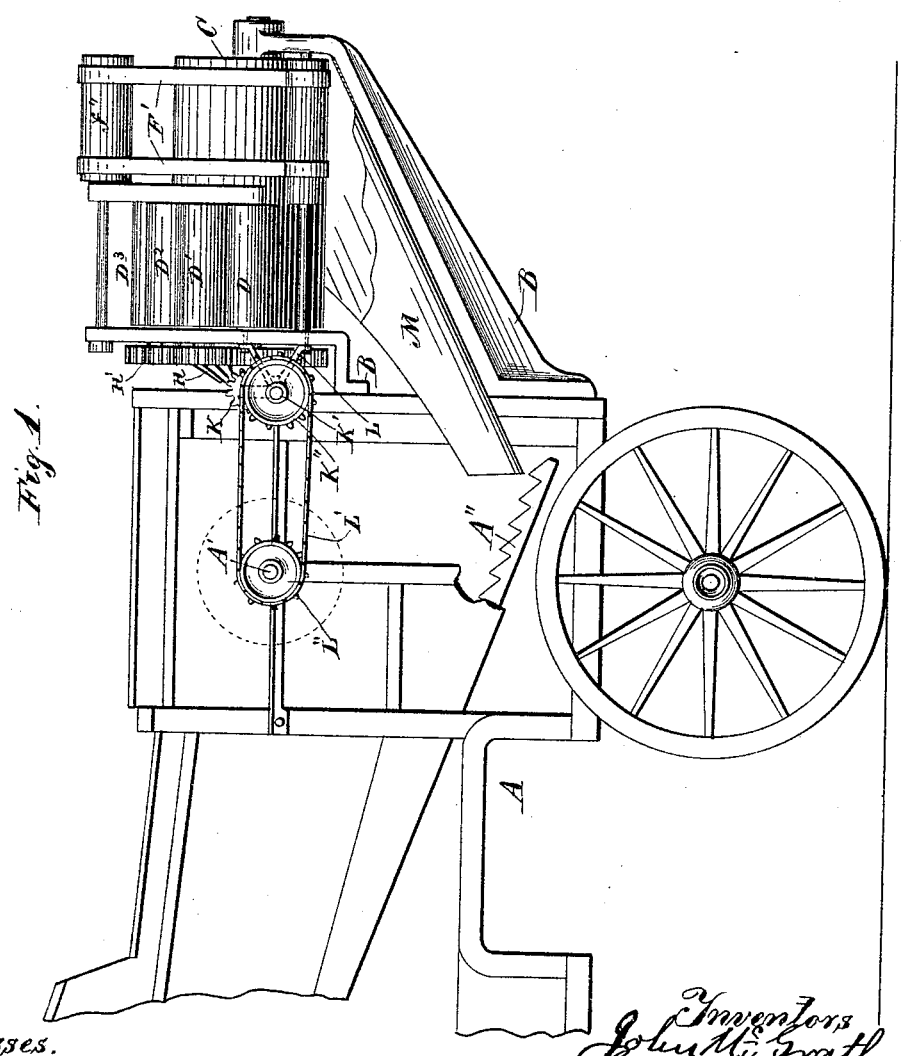
Figure 2:
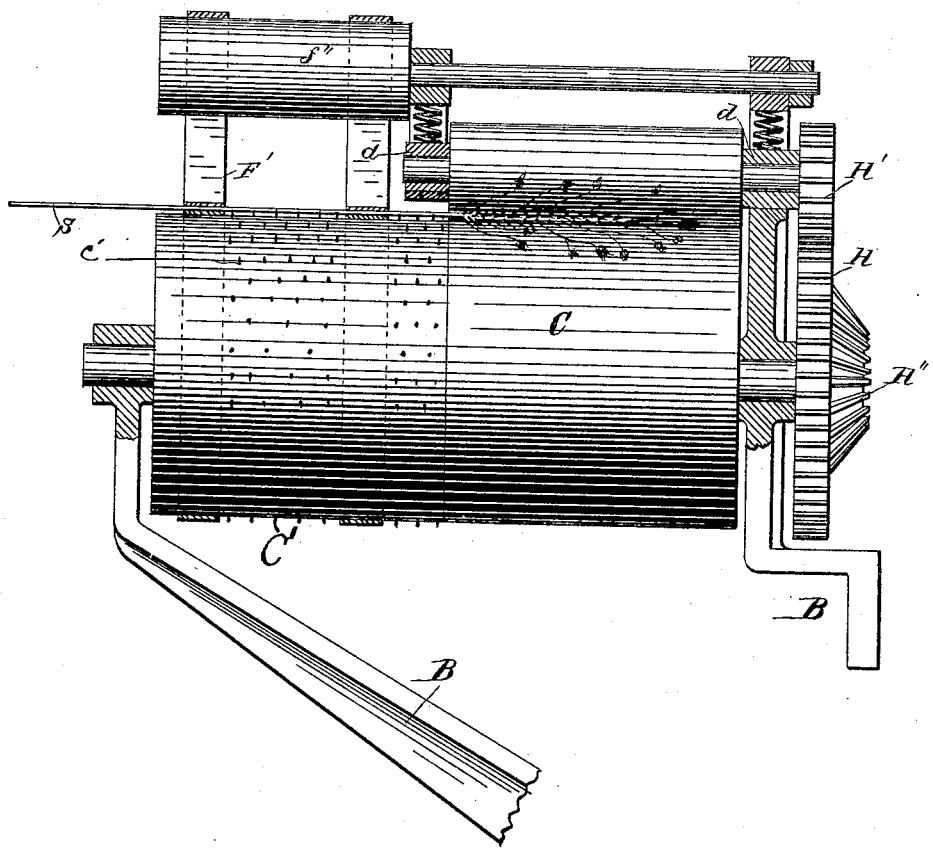
Figure 3:
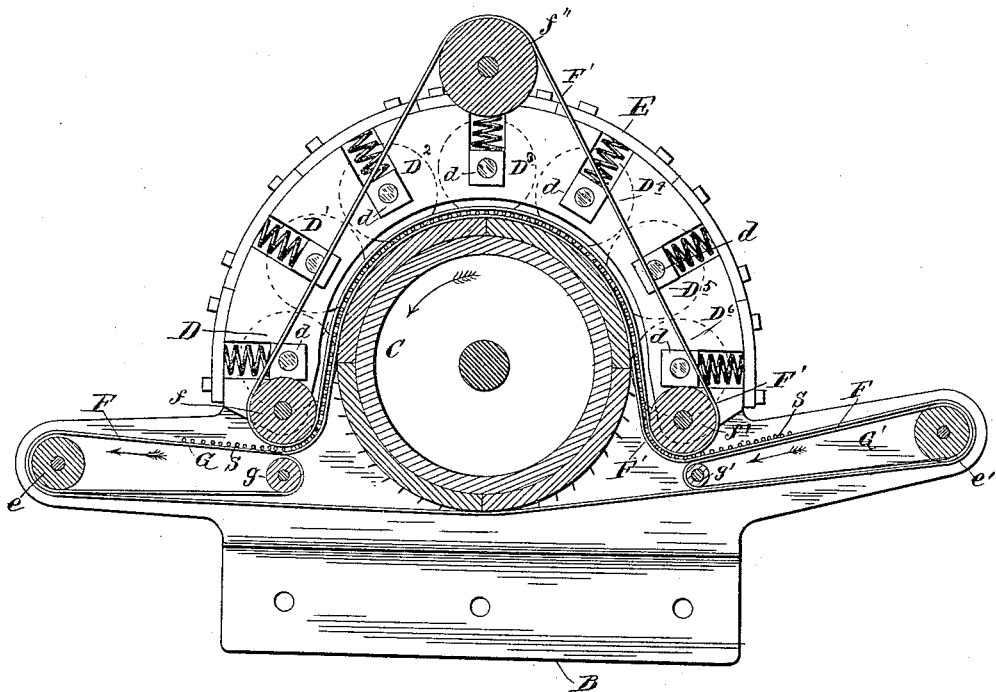

The invention is illustrated in the accompanying drawings, wherein, like letters referring to like parts throughout, Figure 1 is a left side elevation of one form of our flax-thrashers as applied to a common thrashing-machine separator. Fig. 2 is a view, partly in section and partly in elevation, looking from the right side of the flax-thrasher detached; and Fig. 3 is a transverse vertical section of the thrasher detached.

A is a thrashing-machine separator of the ordinary kind.

B is the flax-thrasher frame, adapted to be detachably connected to the front of the separator-frame.

C is the central drum, suitably mounted on the frame B. It may have a smooth or slightly-corrugated surface on its thrashing end and teeth C' on its feeding end.

D D' D² are a multiple set of relatively small rollers arranged around one section of the bed-roller C, mounted in a semicircular frame E in such manner that they may be properly spaced apart from each other and from the bed-roller. Each of the small rollers is mounted in spring-seated bearings $d$ in the ends of the frame E, which renders the same automatically yielding, according to the quantity of material. The frame E, with the multiple set of rollers D D', &c., covers about one-half of the large rollers C, the frame and the rollers being so arranged with reference to the bed-rollers C as to leave an unobstructed passage-way at the front ends of the small rollers.

F F' are the oppositely-moving endless carriers, constituting the feeding device. Of these F is the lower carrier and is mounted on the rollers $e$ $e'$, located, respectively, at the opposite ends or extremities of the frame B, and passing over the upper portion of the free end of the bed-roller C.

F' is the upper endless carrier, which is mounted on the rollers $f$, $f'$, and $f''$, and also passes over the top of the resistance-roller C, above and in proximity to the lower carrier F.

It will be noticed that the carrier-rollers $f$ $f'$ are located comparatively close to the resistance-roller C, while the rollers e e', which support the lower carrier F, are at a considerable distance therefrom. These carriers are driven in opposite directions, receiving and holding the stalks of the flax and presenting only the heads of the same to the thrashing-rollers. The right and left extensions of the lower carrier serve, respectively, as a feed-table for the flax and a discharge-table for the straw. Under these extended portions of the lower carrier may be placed either sheet-belts G and G', running over the rollers e and g and e' g', or fixed tables secured in any suitable way, so as to form a bed under the endless carrier to prevent the flax from falling through. The endless carriers F F', as shown, are in the form of a pair of narrow belts properly spaced apart. Motion is imparted to the thrashing-rollers and the carrier-rollers in any suitable way.

As shown, the resistance-roller C and the multiple rollers D D', &c., are geared together by gears H H', &c., and the large gear H is provided on its face with a bevel-gear H'', engaging with a bevel-pinion K on shaft K'. The shaft K' is mounted on a bracket L, extending from a part of the frame B, and is provided with a sprocket-wheel K'', which by a sprocket-chain L is connected to a sprocket-wheel L' on the cylinder-shaft A' of the thrashing-machine. The endless carriers F and F' are driven by friction from the central drum C.

M is a chute or guide-trough fixed to the frame B under the thrashing-rollers in a position to receive the bolls and seed and deliver the same to the elevator A'' of the separator A. It will thus be seen that the frame B, with the flax-thrashing mechanism, constitutes an attachment which may be detachably connected to the ordinary thrashing-machine separator.

S represents the stalks of flax.

The operation is evident from the description already given. The flax being spread out on the feed-table G', with its stalks on the endless carrier F, is carried forward between the carriers F and F', and is held thereby with the heads presented to the thrashing-rollers, which by their crushing action free the bolls from the stalks and open the same without injury to the seed, and the straw or stalk is passed out at the other side by the carrier F onto the table G entirely untouched and uninjured by the thrashing-rollers. The teeth C' on the free end of roller C prevent the stalk from being drawn from the feed-carriers.

A flax-thrasher constructed on the principle illustrated will give an increased quantity of serviceable seed, inasmuch as with this apparatus none of the seed will be scratched or broken. The gain made in this manner is a very important matter, though it be simply incidental to the main purpose of preserving the straw intact for its fiber.

Of course it will be understood that instead of being built as an attachment to an ordinary thrashing-machine separator our flax-thrasher might equally well or better be embodied with suitable separating or cleaning apparatus in a common frame.

It should be noted that even if the small rollers were of the same length as the bed-rollers, being spring-seated and spaced apart therefrom as they are, the straw would be uninjured as long as the material is fed thereto parallel with the axes of the drum and rollers. It should also be noted that the thrashing mechanism is adapted either to a hand or a gravity feed. The gist of the invention lies in the central drum, and the parallel rollers encircling the same. As long as the unthrashed flax is supplied to the rollers with its stalks parallel thereto the work will be well done. Any device which will permit the stalks to be supplied in this manner or any arrangement of the central drum and the encircling rollers which will permit the parallel feed will be within the spirit of the invention. Preferably, however, we employ a positive feed of the kind described and shown.

Although especially designed for thrashing flax, it will be understood that our invention may be applied to thrashing other kinds of grain—as, for example, rye—where it is desired to save the straw intact.

What we claim, and desire to secure by Letters Patent of the United States, is as follows:

1. A flax-thrasher comprising a central revoluble drum having a substantially continuous surface, and a series of revoluble rollers encircling a part of said drum parallel therewith and in proximity thereto, the said construction being adapted to permit the unthrashed flax to be fed to the drum and rollers parallel with their axes, whereby the bolls may be detached without injury to the straw.

2. A flax-thrasher comprising a central revoluble drum having a substantially continuous surface, and a series of revoluble rollers encircling said drum, the peripheral surfaces of the drum and the rollers being free from annular corrugations, the said construction permitting a parallel feed of the unthrashed flax in line with the drum and rollers.

3. In a thrashing-machine, the combination, with a central drum having a substantially continuous surface revoluble at a relatively low rate of speed, of a series of rollers encircling said drum revoluble at a relatively high rate of speed, the said construction being adapted to permit the unthrashed flax to be fed thereto parallel therewith.

4. In a thrashing-machine, the combination, with a thrashing mechanism consisting of a central revoluble drum and a series of rollers encircling the same, of a feeding mechanism adapted to feed the unthrashed grain to the thrashing-mechanism with its stalks parallel to the axes of the drum and rollers.

5. The combination, with the central drum and the encircling rollers of less length than the drum, of the feed-bands and their guide-rollers, and the staggered pins on that part of the drum extended beyond the rollers, substantially as described.

6. The flax-thrasher comprising a central revoluble drum, the series of adjustably-seated rollers under tension encircling a part of said drum parallel therewith and in proximity thereto, the said rollers being of less length than the drum, the double set of feed-bands driven face to face in the same direction over the part of said drum extended beyond said rollers, and suitable guide-rollers for supporting and directing the bands, substantially as described.

In testimony whereof we affix our signatures in presence of two witnesses.

JOHN McGRATH.
GEORGE Y. SMITH.

Witnesses:
JAS. F. WILLIAMSON,
EMMA F. ELMORE.